United States Patent [19]
Jones

[11] Patent Number: 5,054,283
[45] Date of Patent: Oct. 8, 1991

[54] TURBINE ENGINE IMPINGEMENT ASSEMBLY

[75] Inventor: Anthony Jones, San Diego, Calif.

[73] Assignee: Sundstrand Corporation, Rockford, Ill.

[21] Appl. No.: 409,314

[22] Filed: Sep. 19, 1989

[51] Int. Cl.$^5$ .......................................... F02C 7/272
[52] U.S. Cl. ................................................ 60/39.142
[58] Field of Search ............................. 60/39.142, 625

[56] References Cited

U.S. PATENT DOCUMENTS

| | | | |
|---|---|---|---|
| 2,457,833 | 1/1949 | Redding | 60/39.142 |
| 2,597,641 | 5/1952 | Hull et al. | 60/39.142 |
| 2,640,315 | 6/1953 | Secord | 60/39.142 |

Primary Examiner—Louis J. Casaregola
Attorney, Agent, or Firm—Wood, Phillips, Mason, Recktenwald & Van Santen

[57] ABSTRACT

In order to rapidly start turbine engines in a manner eliminating resort to complex mechanical components, an auxiliary impingement assembly is disclosed. The turbine engine will typically have a turbine rotor with impeller blades integral therewith. It will also include a combustor for producing hot gases of combustion and communicating with the turbine rotor through a turbine nozzle. The turbine engine will normally be driven by the hot gases of combustion produced by the combustor. With this arrangement, the auxiliary impingement assembly will include a self-contained independent source of hot gases which may be directed at the impeller blades to assist the combustor in starting the turbine engine.

12 Claims, 2 Drawing Sheets

TURBINE ENGINE IMPINGEMENT ASSEMBLY

FIELD OF THE INVENTION

The present invention is generally directed to a turbine engine and, more particularly, a turbine engine utilizing an auxiliary impingement assembly.

BACKGROUND OF THE INVENTION

For many applications, it is essential for a turbine engine to start quickly and reliably. This is important, for instance, for turbine engine-driven missiles and similar applications wherein start times and start reliability must typically meet very stringent requirements. For such purposes, it has been common to utilize a starting turbine which is mechanically linked to the main turbine.

More specifically, the starting turbine is typically driven by rocket combustion by-products. Then, through the mechanical linkage between the starting turbine and the main turbine, the main turbine can more rapidly get up to speed than would be the case by simply utilizing the combustor that will produce hot gases for driving the main turbine thereafter. Unfortunately, this technique is known to be less than entirely desirable.

For instance, the utilization of a starting turbine greatly increases the overall cost and complexity of the operating components. It will also be appreciated that such a system is lacking in efficiency due to the necessity for indirect reaction of the main turbine to the starting turbine. Still further, the utilization of a starting turbine makes it difficult to provide for compact packaging of the operating components.

The present invention is directed to overcoming the above stated problems and accomplishing the resulting objects.

SUMMARY OF THE INVENTION

It is a principal object of the present invention to provide a turbine engine having auxiliary start assist means. It is a further object of the invention to provide a turbine engine in which the auxiliary start assist means includes a self-contained independent source of hot gases. It is likewise an object of the present invention to provide a turbine engine in which such hot gases are directed at the impeller blades of the turbine rotor to assist starting.

In a preferred form of the invention, the turbine engine has a turbine rotor with impeller blades integral therewith. It also has a combustor associated therewith for producing hot gases of combustion wherein the combustor communicates with the turbine rotor through a turbine nozzle. In other words, the turbine engine is normally driven by the hot gases of combustion produced by the combustor.

With this arrangement, the turbine engine further includes auxiliary means associated with the turbine rotor. The auxiliary means is effective to assist the combustor in starting the turbine engine and, for this purpose, includes a self-contained and combustor-independent source of hot gases. Further, the auxiliary means includes means for directing the hot gases at the impeller blades.

Preferably, the turbine engine has an exhaust duct leading from the turbine rotor, and the auxiliary means includes a start cartridge mounted within the radial extent of the exhaust duct. In this connection, the start cartridge may advantageously be mounted within the radial extent of the exhaust duct at a point downstream of the turbine rotor. As will be appreciated, the start cartridge comprises the self-contained independent source of hot gases to be directed at the impeller blades.

In the preferred embodiment, the means for directing the hot gases from the self-contained independent source includes a pair of transfer tubes. The transfer tubes lead from the self-contained independent source to the turbine rotor. In addition, the means for directing the hot gases from the self-contained independent source includes nozzle means associated with each of the transfer tubes.

Still more specifically, the nozzle means preferably includes a pair of impingement nozzles disposed in diametrically opposed and oppositely directed relation relative to the impeller blades. Also, the turbine engine preferably includes a pair of turbine nozzles. With this construction, the turbine nozzles are preferably diametrically opposed and oppositely directed at a point located upstream of the impingement nozzles.

As a result, the turbine nozzles are well suited for directing the hot gases of combustion from the combustor at the impeller blades. In this connection, the turbine engine may advantageously utilize an annular combustor surrounding and communicating with the turbine rotor through the turbine nozzles. In this manner, the hot gases of combustion produced by the combustor can drive the turbine rotor by impinging on the impeller blades.

In yet another respect, the present invention contemplates the turbine nozzles and impingement nozzles being disposed in axially spaced relation. Both the turbine nozzles and the impingement nozzles, as previously mentioned, are, respectively, in diametrically opposed and oppositely directed relation relative to the impeller blades such that the hot gases of combustion from the combustor and the hot gases from the start cartridge may simultaneously impinge upon the impeller blades in a manner driving the turbine rotor. As a result, it will be appreciated that the turbine nozzles and the impingement nozzles are adapted to direct hot gases at the impeller blades concurrently.

Other objects, advantages and features of the present invention will become apparent from a consideration of the following specification taken in conjunction with the accompanying drawings.

DETAILED DESCRIPTION OF THE PREFERRED EMBODIMENT

Figure 1:
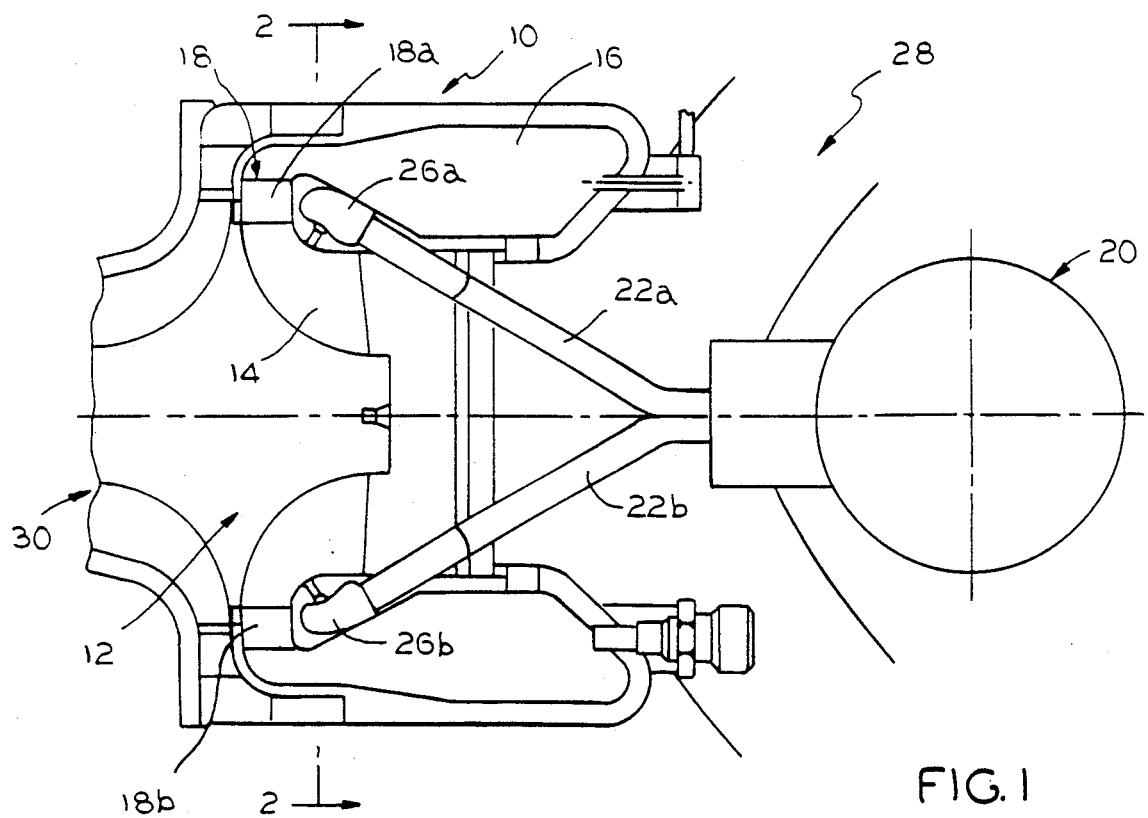
FIG. 1 is a sectional view, partially schematic, illustrating necessary portions of a turbine engine in accordance with the present invention.

Referring to the drawings, and first to FIG. 1, the reference numeral 10 designates generally a turbine engine in accordance with the present invention. The turbine engine 10 includes a turbine rotor 12 having impeller blades 14 integral therewith. It also includes a combustor 16 for producing hot gases of combustion and, as illustrated, the combustor 16 communicates with the turbine rotor 12 through a turbine nozzle 18. The turbine engine 10 is normally driven by the hot gases of combustion produced by the combustor 16. However, the turbine engine 10 also includes auxiliary means associated with the turbine rotor 12 for assisting the combustor 16 in the starting thereof.

Figure 2:
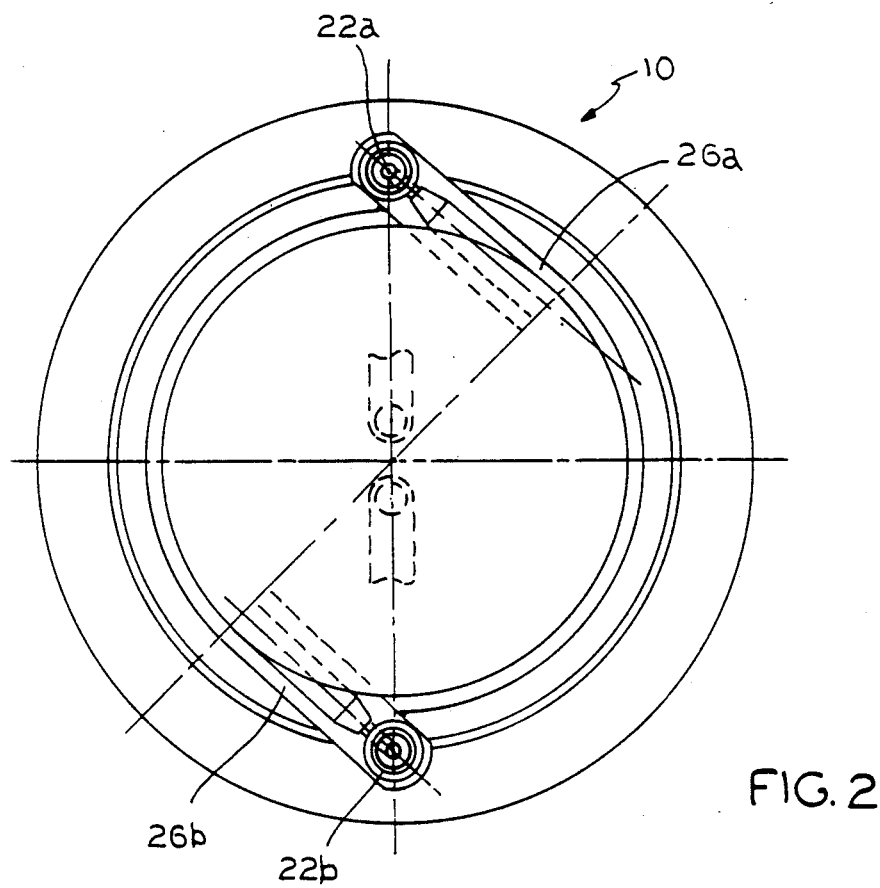
FIG. 2 is a sectional view taken generally on the line 2—2 of FIG. 1 and illustrating an impingement assembly for the turbine engine of the present invention.
Figure 3:
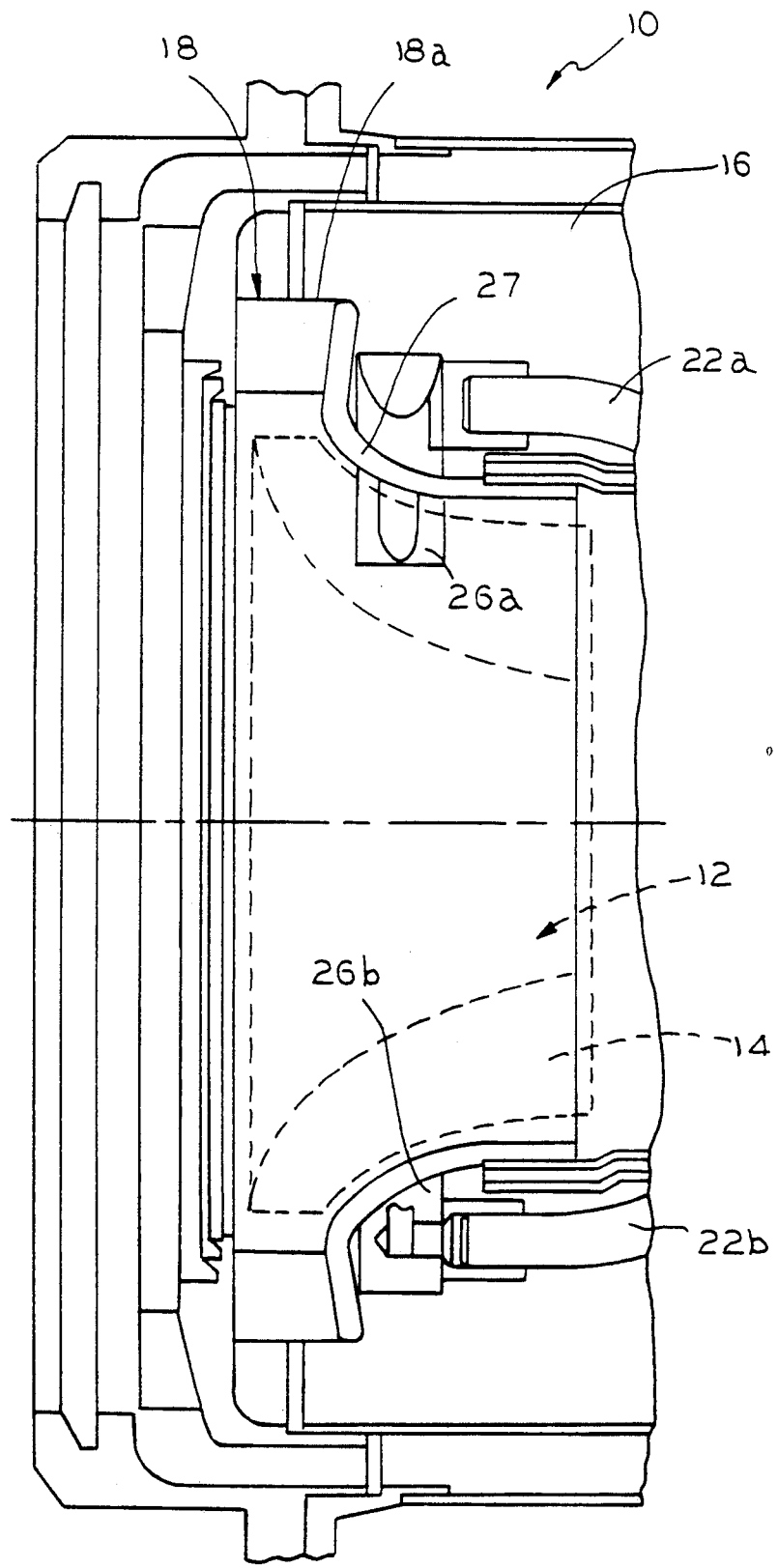
FIG. 3 is a sectional view similar to FIG. 1 with the turbine rotor and impeller blades shown in phantom to illustrate the turbine impingement nozzles.

More specifically, the auxiliary means includes a self-contained independent source of hot gases 20 together with means for directing the hot gases from the self-contained independent source 20 at the impeller blades 14. It will also be seen that, as illustrated, the means for directing the hot gases from the self-contained independent source 20 includes a pair of transfer tubes 22a and 22b leading from the self-contained independent source 20 to the turbine rotor 12 together with nozzle means associated with each of the transfer tubes 22a and 22b. In this connection, the nozzle means advantageously comprises a pair of impingement nozzles 26a and 26b mounted in an inner wall or housing 27 so as to be disposed in diametrically opposed and oppositely directed relation relative to the impeller blades 14 (see, also, FIG. 2 and 3). Thus, the impingement nozzles 26a and 26b are adapted to direct hot gases from the self-contained independent source 20 which pass through the transfer tubes 22a and 22b in a direct impinging fashion against the impeller blades 14. In this manner, the combustor 16 is positively and directly assisted in starting the turbine engine 10.

In the preferred embodiment, the turbine engine 10 includes a pair of turbine nozzles 18a and 18b disposed in diametrically opposed and oppositely directed relation. The turbine nozzles 18a and 18b are adapted to direct the hot gases of combustion from the combustor 16 at the impeller blades 14 at a point upstream of the impingement nozzles 26a and 26b (i.e., in axially spaced relation thereto). As a result, the turbine nozzles 18a and 18b and the impingement nozzles 26a and 26b are adapted to direct hot gases at the impeller blades 14 concurrently.

As shown in FIG. 1, the combustor 16 is preferably annular and surrounds the turbine rotor 12 in conventional fashion. It will also be appreciated from the foregoing that the combustor produces hot gases of combustion for driving the turbine rotor 12 by impinging on the impeller blades 14 following which the hot gases of combustion exit through an exhaust duct 28 downstream of the turbine rotor 12. In like fashion, the hot gases from the self-contained independent source 20 exit through the exhaust duct 28 after they have impinged on the impeller blades 14.

As shown in FIG. 1, the self-contained independent source 20 of hot gases preferably comprises a start cartridge. This start cartridge 20 is mounted within the radial extent of the exhaust duct 28 of the turbine engine 10 downstream of the turbine rotor 12. In this manner, all of the hot components are at the hot end of the turbine engine 10 rather than at the compressor end thereof.

With the present invention, a turbine engine impingement assembly is utilized to allow auxiliary rocket propulsion by-products to be delivered to turbine rotor impeller blades during engine start-up. The rocket propulsion source or start cartridge 20 may comprise any of a variety of commonly known pyrotechnic cartridges capable of generating a hot gas suitable for impingement directly against the impeller blades 14 of the turbine rotor 12. In this manner, the turbine rotor 12 may rapidly be brought up to speed after which hot gases of combustion from the combustor 16 continue to deliver a sustaining stream to maintain the continued rotation of the turbine rotor 12.

Because of this unique arrangement, earlier combustor light-off is available.

As will be appreciated, earlier combustor light-off produces concurrent torque from the combustor 16 as well as the start cartridge 20. This, in turn, results in very high efficiency due to turbine reaction, i.e., the direct impingement of hot gases of combustion from the combustor 16 as well as direct impingement of the hot gases from the start cartridge 20 directly on the main turbine. Moreover, all of the hot components are at the hot end of the turbine engine 10, i.e., there are no hot components at the compressor end 30 of the turbine engine 10.

On the contrary, the compressor end 30, which has only been partially schematically illustrated, can be conventionally constructed. This, coupled with the mounting of the start cartridge 20, transfer tubes 22a and 22b, and impingement nozzles 26a and 26b within the radial extent of the exhaust duct 28 and adjacent the turbine rotor 12, makes for compact packaging without external tubes or connections. Further, combustion of start cartridge gas products reduces smoke while additional thrust results from afterburning.

As will be appreciated, other details of the turbine engine 10 have been omitted where they are unnecessary for an understanding of the present invention. Such details are conventional and well within the skill of those in the art. Accordingly, it is believed that they the ability to understand the present invention is enhanced by focusing solely on the unique features thereof.

While in the foregoing there has been set forth a preferred embodiment of the invention, it will be appreciated that the details herein given may be varied by those skilled in the art without departing from the true spirit and scope of the appended claims.

I claim:

1. In a turbine engine having a turbine rotor, said turbine rotor having impeller blades integral therewith, said turbine engine having a combustor associated therewith for producing hot gases of combustion, said combustor communicating with said turbine rotor through a turbine nozzle, said turbine engine normally being driven by said hot gases of combustion, the improvement comprising:

auxiliary means associated with said turbine rotor for assisting said combustor in starting said turbine engine, said auxiliary means including a self-contained independent source of hot gases, said auxiliary means including means for directing said hot gases from said self-contained independent source at said impeller blades;

said turbine engine having an exhaust duct leading from said turbine rotor, said auxiliary means including a start cartridge mounted within the radial extend of said exhaust duct downstream of said turbine rotor, said start cartridge comprising said self-contained independent source of hot gases to be directed at said impeller blades.

2. The turbine engine as defined in claim 1 wherein said means for directing said hot gases from said self-contained independent source at said impeller blades includes a pair of transfer tubes leading form said self-contained independent source to said turbine rotor together with an impingement nozzle associated with each of said transfer tubes.

3. The turbine engine as defined in claim 2 including a pair of said turbine nozzles disposed in diametrically opposed and oppositely directed relation for directing said hot gases of combustion from said combustor at said impeller blades at a point upstream of said auxiliary means including said impingement nozzles.

4. The turbine engine as defined in claim 2 wherein said impingement nozzles are mounted in diametrically opposed and oppositely directed relation relative to said impeller blades to direct hot gases from said start cartridge passing through said transfer tubes in a direct impinging fashion against said impeller blades.

5. A turbine engine, comprising:
a turbine rotor having impeller blades integral therewith;
an annular combustor surrounding and communicating with said turbine rotor through a pair of turbine nozzles, said combustor producing hot gases of combustion for driving said turbine rotor by impinging on said impeller blades; and
auxiliary means associated with said turbine rotor for assisting said combustor in starting said turbine engine, said auxiliary means including a self-contained independent source of hot gases mounted within the radial extent of an exhaust duct of said turbine engine, said auxiliary means including means for directing said hot gases from said self-contained independent source at said impeller blades.

6. The turbine engine as defined in claim 5 wherein said exhaust duct of said turbine engine is disposed downstream of said turbine rotor, said auxiliary means including a start cartridge mounted within the radial extent of said exhaust dust downstream of said turbine rotor, said start cartridge comprising said self-contained independent source of hot gases to be directed at said impeller blades.

7. The turbine engine as defined in claim 5 wherein said means for directing said hot gases from said self-contained independent source at said impeller blades includes a pair of transfer tubes leading from said self-contained independent source to said turbine rotor together with an impingement nozzle associated with each of said transfer tubes.

8. The turbine engine as defined in claim 7 wherein said turbine nozzles are disposed in diametrically opposed and oppositely directed relation for directing said hot gases of combustion from said combustor at said impeller blades at a point upstream of said auxiliary means including said impingement nozzles.

9. The turbine engine as defined in claim 7 wherein said impingement nozzles are mounted in diametrically opposed and oppositely directed relation relative to said impeller blades to direct hot gases from said start cartridge passing through said transfer tubes in a direct impinging fashion against said impeller blades.

10. A turbine engine, comprising:
a turbine rotor having impeller blades integral therewith;
a combustor communicating with said turbine rotor through a pair of diametrically opposed and oppositely directed turbine nozzles, said combustor producing hot gases of combustion delivered through said turbine nozzles for driving said turbine rotor; and
auxiliary means associated with said turbine rotor for assisting said combustor in starting said turbine engine, said auxiliary means including a start cartridge mounted within said turbine engine and adapted to produce hot gases, said auxiliary means including means for directing said hot gases from said start cartridge at said impeller blades;
said turbine engine including an exhaust duct disposed downstream of said turbine rotor, said start cartridge being mounted within the radial extent of said exhaust duct, said start cartridge comprising a self-contained independent source of said hot gases to be directed at said impeller blades.

11. The turbine engine as defined in claim 9 wherein said means for directing said hot gases from said start cartridge at said impeller blades includes a pair of transfer tubes leading form said start cartridge to said turbine rotor together with a pair of impingement nozzles disposed in diametrically opposed and oppositely directed relation relative to said impeller blades.

12. The turbine engine as defined in claim 11 wherein said turbine nozzles are adapted to direct said hot gases of combustion from said combustor at said impeller blades upstream of said impingement nozzles, said impingement nozzles being adapted to direct said hot gases from said start cartridge at said impeller blades at the same time said hot gases of combustion from said combustor are being directed at said turbine nozzles.

* * * * *